United States Patent [19]
Sykes et al.

[11] Patent Number: 5,136,803
[45] Date of Patent: Aug. 11, 1992

[54] BAIT BOX

[76] Inventors: Brain M. Sykes; David S. Brooks, both of 300 City Road, Sheffield, S2 England

[21] Appl. No.: 673,326

[22] Filed: Mar. 22, 1991

[30] Foreign Application Priority Data

Apr. 6, 1990 [GB] United Kingdom ................. 9007832

[51] Int. Cl.$^5$ .............................................. A01M 1/20
[52] U.S. Cl. ....................................................... 43/131
[58] Field of Search ........................................... 43/131

[56] References Cited

U.S. PATENT DOCUMENTS

| | | | |
|---|---|---|---|
| 4,228,613 | 10/1980 | Kalmasy | 43/131 |
| 4,550,525 | 11/1985 | Baker | 43/131 |
| 4,825,581 | 5/1989 | Dailey | 43/131 |
| 4,835,902 | 6/1989 | Sherman | 43/131 |

Primary Examiner—Kurt Rowan
Attorney, Agent, or Firm—Trexler, Bushnell, Giangiorgi & Blackstone

[57] ABSTRACT

A bait box 1 for pest control comprises an elongate, tube like container defined by a base 3, side walls 4, end walls 5 and a lid 7, with inlet/outlet apertures 14 provided in each end wall 5, with a bait holder 19 located within the box interior 6, and secured thereto, and with lockable or latchable access means 6 to the box interior.

13 Claims, 2 Drawing Sheets

BAIT BOX

This invention relates to a bait box of a kind intended for the control of pests, particularly mice.

The purpose of such a bait box is of course to house a poisonous bait, with the box located along a suspected mouse run, with the aim of encouraging the mouse to enter the box and consume some of the poisonous bait.

A well known bait box is a straight through tube, folded from a lay-flat cardboard blank to produce a flat base, a lid, two side walls, and with mouse entry/exit apertures formed in each of two end walls. Before closing the box lid, which is secured by a simple flap entering a slit in a side wall, bait in either granular, block or paste form is placed into the box. Such a straight through tube, being of slim dimensions is, advantageously, locatable in the majority of confined spaces but frequently results in bait loss, sometimes through mishandling of the box, while furthermore is by no means tamper proof, in that children or others can readily gain access to the box interior either through the end apertures or by lifting the box lid, and hence gain access to and/or remove the poisonous bait.

Proposals have been made for safer, tamper proof bait boxes, but such proposals have usually resulted in a bait box of enlarged dimensions, thus diminishing the number of places where a box may be located, whilst also increasing the cost.

One specific tamper proof proposal has a bait compartment defined between a pair of upstanding ribs, with the bait nipped between a box base and a removable box lid by downwardly depending pin of the lid adapted to press on a solid bait. Again, such a box is of relatively large dimensions and provides no guarantee of bait retention.

According to the present invention, there is provided a bait box for the control of pests comprising an elongate, tube like body member defined by a base, a pair of spaced-apart, parallel side walls, a pair of spaced-apart parallel end walls which together define a box interior, a closure lid, a pest inlet/outlet aperture provided in each end wall, a bait holder located within the box interior, and secured thereto, and a lockable or latchable access means to the box interior.

Thus, with the box in accordance with the invention, the bait is positively retained within the box interior and cannot be deliberately extracted or accidentally lost via an inlet/outlet aperture while, by retaining to a straight through tube like configuration, the box in accordance with the invention remains of relatively small size and hence locatable with virtually all confined or inaccessible locations.

Preferably, the box is produced as a moulding in synthetic plastics to provide a virtually indestructable, multiple-use box. The access means may in fact be constituted by the closure lid, which may be a removable or releasable, rectangular lid. The lid may be a separate component from the body member, which component is a snap fit or is otherwise latched in its closed position, or may be hinged thereto. As an alternative to the lid constituting in toto the access means, the latter may be provided by a latchable or lockable slide door or hinged flap provided in the lid, or in a side wall.

In detail, locking or latching means for the lid may comprise a resilient latch member having a stepped surface adapted to be engaged automatically behind a latching surface provided towards an upper end of each side wall upon the lid being snapped into its closed position, with a small access hole adjacent each latching surface for the insertion of the blade of a small screwdriver or a pin to displace the latch members from their engaging positions when it is required to openthe box.

Preferably, each end wall of the box is inclined, with ends of each side wall projecting past the adjacent end wall, to constitute wings.

It is also preferred for the apertures in each end wall to be sideways 'D'-shaped, and for screw means to be provided so that the box may be screwed to the floor through its base, to ensure positive retention of the box in its desired location, or screwed through a side wall e.g. to a skirting board, at floor level or at an elevated location.

The bait holder may be permanently, or temporarily secured to the box interior, specifically to the inside of one side wall, and preferably at a mid-length position of the box, so as to render difficult if not impossible the touching of the bait by children etc., through an inlet/outlet aperture. Temporary location results in a holder that may be removed for stale or inactive bait to be cleaned out, fresh bait inserted, and the holder replaced within the box interior. Retention of the holder may be by providing a pair of spaced-apart mutually facing and upstanding ribs on one side wall, behind which ribs a pair of flanges of the holder are adapted to be engaged. Hence the holder is a simple slide-in, slide-out fit behind the ribs, in a vertical direction, being trapped against the box base when the access means is closed.

The bait holder may be constituted as a containment cup or containment strap. For pre-formed bait blocks, the cup or strap aperture should be approximate to the bait dimensions, while the dimensions of the holder are of little consequence for bait in the form of a paste dispensed from an industry-standard gun. In detail, the strap may be integrally moulded with a back plate, with projecting lateral edges of the back plate constituting the flanges.

The invention will now be described in greater detail, by way of example, with reference to the accompanying drawings in which FIG. 1 is a perspective view of a bait box in accordance with the invention;

Figure 1:
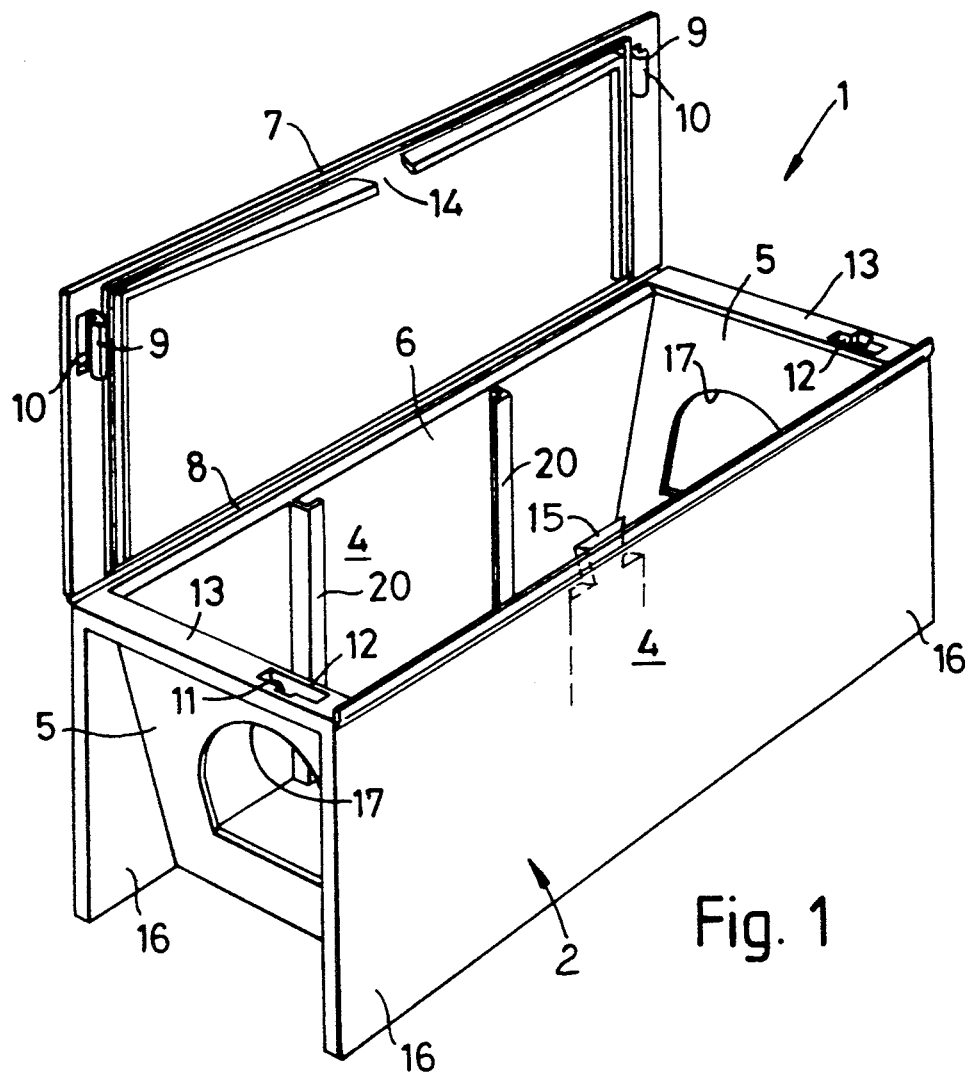

In the drawings, a bait box 1 is moulded in synthetic plastics material and is of elongate, tube-like form, comprising a body member 2 having a base 3 integral with two parallel, spaced-apart elongate side walls 4 and with two end walls 5, which together define an interior 6. In the embodiment illustrated, an access means to the interior 6 is provided by a lockable or latchable a rectangular lid 7 integrally moulded with one side wall 4 for movement about a hinge 8. Remote from its hinge, the lid 7 is provided at each end with a resilient latch member 9 having a stepped surface 10 adapted to engage automatically behind a latching surface 11 provided by an aperture 12 formed in a transverse element 13 bridging the side wall 4. The lid 7 is also latched at the centre of its edge remote from the hinge 8, for instance by a tongue 14 on the lid being a snap fit into a groove 15 provided at an upper part of the adjacent side wall 4.

Figure 2:
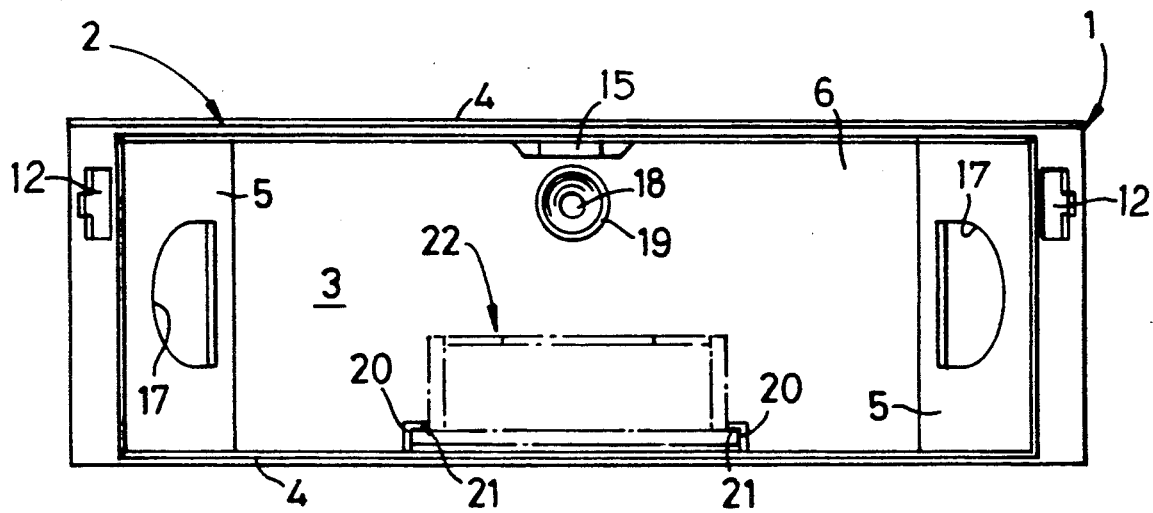
FIG. 2 is a plan view of the bait box of FIG. 1 with its lid or cover removed.
Figure 3:
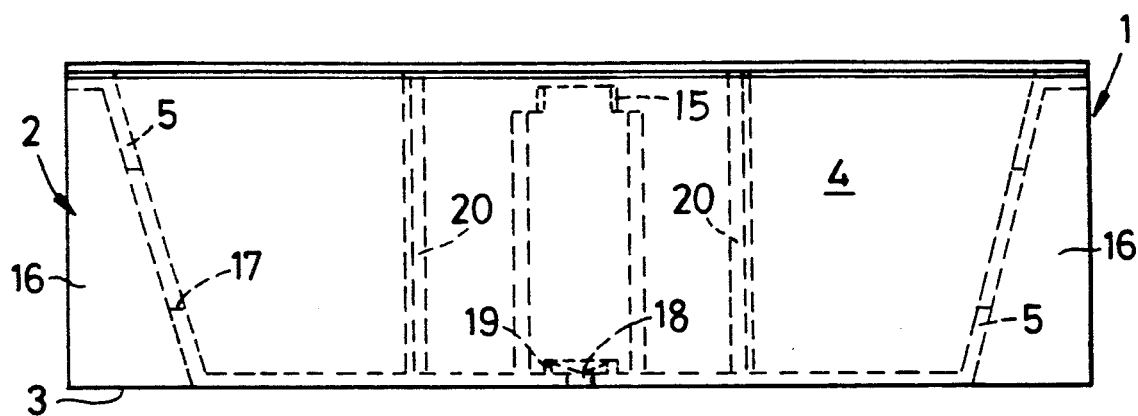
FIG. 3 is a side elevation of FIG. 2.
Figure 4:
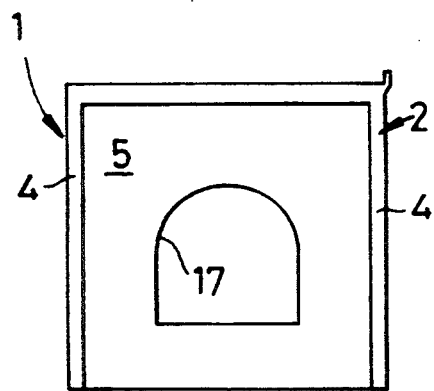
FIG. 4 is an end elevation of FIG. 2.

Each end wall 5 is inclined, as best seen in FIGS. 1 to 3, with ends of each side wall 4 projecting past the adjacent end wall 3 to constitute wings 16, while each end wall 5 is provided with a 'D'-shaped aperture 17, and the base 3 is provided with a screw hole 18 to receive a screw 19 so that the box 1 may be screwed to the floor and hence positively located.

The side wall 4 carrying the hinge 8 is provided at approximately its mid-length, with a pair of spaced-apart, mutually facing and upstanding ribs 20, behind which ribs a pair of flanges 21 of a bait holder 22 are adapted to be engaged as a slide-in, slide-out fit behind the ribs 20, in a vertical direction, being trapped against the upper surface of the base 3 when the lid 7 is closed.

Figure 5:
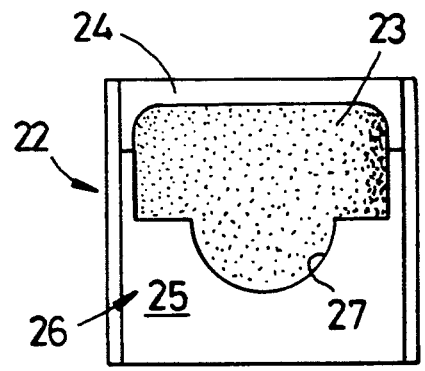
FIG. 5 is a front elevation of the bait holder.
Figure 6:
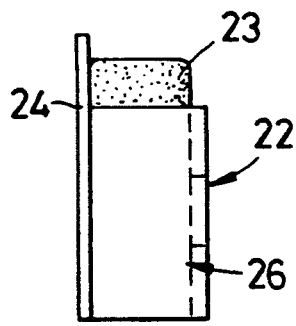
FIG. 6 is a side elevation of FIG. 5.
Figure 7:
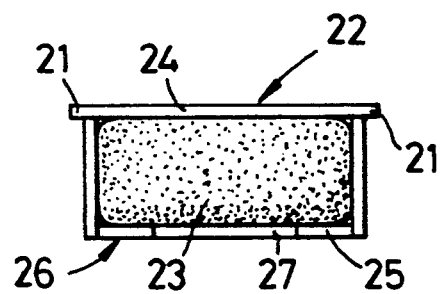
FIG. 7 is a plan view of FIG. 5.

As best seen in FIGS. 5 to 7, the bait holder 22, again preferably moulded in synthetic plastics material, constitutes a containment cup or strap for a preformed block 23 of poisonous bait, the flanges 21 being formed integrally at opposite edges of a back plate 24, and a front wall 25 of a strap portion 26 being provided with a cutaway portion 27 to provide greater exposure of, and hence access to, the bait block 20.

We claim:

1. A bait box for the control of pests comprising an elongate, tube like body member defined by a base, a pair of spaced-apart, parallel side walls upstanding from said base, a pair of spaced-apart parallel end walls also upstanding from said base and which together define a box interior, a closure lid, a pest inlet/outlet aperture provided in each of said end walls, an insertable and removable carriage holder for a bait block located at the mid-length of said tube-like body member, and secured with positive positional retention within said box interior, and a securable access means to said box interior.

2. A bait box as claimed in claim 1, produced as a moulding in synthetic plastics.

3. A bait box as claimed in claim 1 or claim 2, wherein a removable or releasable, rectangular lid constitutes the access means.

4. A bait box as claimed in claim 3, wherein said lid is a hinged, separate component from the body member.

5. A bait box as claimed in claim 3, wherein a snap-fit arrangement is provided between said lid and said body member to secure said access means in its closed position.

6. A bait box as claimed in claim 1, wherein each of said end walls is inclined, with ends of each said side wall projecting past said adjacent end wall, to constitute wings.

7. A bait box as claimed in claim 1, wherein said apertures in each respective end wall are sideways 'D'-shaped.

8. A bait box as claimed in claim 1, wherein screw means is provided to screw said box in position.

9. A bait box as claimed in claim 1, wherein a pair of spaced-apart mutually facing and upstanding ribs are provided on one said side wall, are provided on said holder and are adaped to be engaged behind said ribs.

10. A bait box as claimed in claim 1, comprising a rectangular lid hinged to said body member, a resilient latch member provided at opposite ends of said lid, a stepped surface provided on each said latch member, a latching surface provided towards an uppper end of each side wall and engageable automatically by one of said latch members upon the lid being snapped into its closed position, with a small access hole adjacent each latching surface for the insertion of the blade of a small screwdriver to displace the latch members from their engaging positions when it is required to open said box.

11. A bait box as claimed in claim 1, wherein the containment strap constitutes said bait holder.

12. A bait box as claimed in claim 11, wherein for pre-formed bait blocks an aperture of said strap approximates to the bait block dimensions.

13. A bait box as claimed in claim 11 wherein said strap is integrally moulded in synthetic plastics material with a back plate, projecting lateral edges of the back plate constituting flanges adapted to be engaged behind a pair of spaced apart ribs provided on an interior surface of one of said side walls.

* * * * *